Sept. 20, 1966

M. STIMLER 3,274,440

PHOTOFLASH OPTICAL PUMPING CIRCUIT

Filed March 22, 1963

INVENTOR
MORTON STIMLER

BY

ATTORNEY 3,274,440
PHOTOFLASH OPTICAL PUMPING CIRCUIT
Merton Stimler, Hyattsville, Md., assignor to the United
States of America as represented by the Secretary of the Navy
Filed Mar. 22, 1963, Ser. No. 267,371
1 Claim. (Cl. 315—239)

The invention described herein may be manufactured and used by or for the Government of the United States of America for governmental purposes without the payment of any royalties thereon or therefor.

This invention relates to an electrical circuit for supplying energy to electronic flash bulbs and more particularly to a condenser charging circuit employing a low voltage D.C. source and a saturating transformer.

In the present design of electrical charging circuits for electronic photoflash units, normally a high voltage is required for charging capacitors to the potential needed for the flashing unit. This high voltage requirement brings about the need for large capacitors with high voltage ratings in addition to the need for a high voltage source for energizing such circuits.

In accordance with the present invention the high voltage for the flash tube is provided by the use of a saturable core transformer. With the use of a capacitor bank for supplying the primary circuit of a saturable core transformer, a low potential D.C. voltage source may be used to supply energy for the charging circuit.

An object of this invention is to provide a photoflash supply circuit employing a saturable core transformer in the supply circuit and in the load circuit.

Another object of this invention is to provide a new and improved energy supply circuit for a photoflash system operated from a low voltage D.C. source.

A further object of this invention is to provide a power supply for an electronic flash unit employing capacitors supplied with a low input D.C. voltage.

Figure 1:
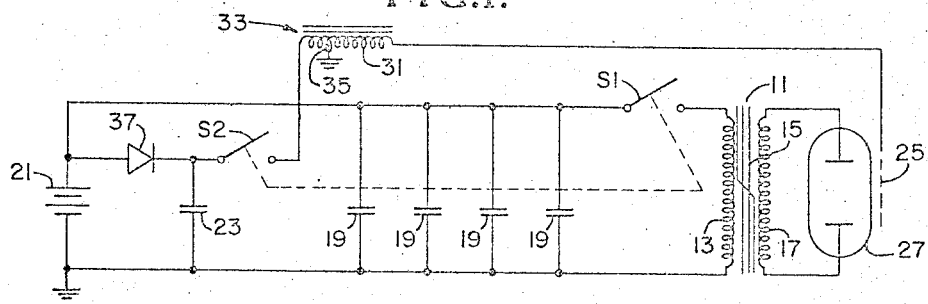
Figure 2:
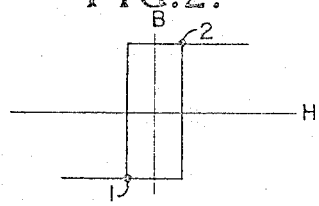
Figure 3:
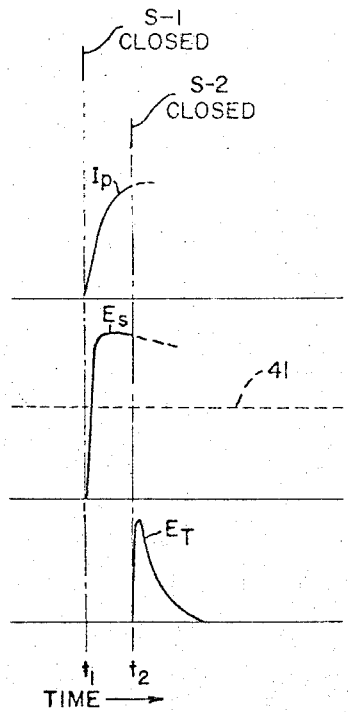

Other objects and many of the attendant advantages of this invention will be readily appreciated as the same becomes better understood by reference to the following detailed description when considered in conjunction with the accompanying drawing wherein:

FIG. 1 illustrates an exemplary embodiment of the flash tube charging circuit of this invention, FIG. 2 illustrates a B-H loop of the saturable core transformer of this invention; and FIG. 3 illustrates current, voltage and time relationships pertaining to the operation of the flash tube charging circuit of FIG. 1.

Referring now to FIG. 1 of the drawing, a power supply circuit is illustrated in which a saturable core transformer 11 is employed. Transformer 11 is provided with primary winding 13, saturable core 15 and secondary winding 17. Capacitor means such, for example, as a plurality of parallel connected capacitors 19 connect to primary winding 13 through switch S–1 and to a voltage source 21. A trigger capacitor 23 is also connected to voltage source 21. One terminal of source 21 is connected to an electrode 25 of electron flash tube 27 through switch S–2, diode 37, and winding 31 of step-up transformer 33. Step-up transformer 33 is grounded at juncture 35. Diode 37 provides isolation between trigger capacitor 23 and parallel connected capacitor 19. If desired, diode 37 may be eliminated and capacitor 23 connected in parallel with capacitors 19. Switches S–1 and S2 are shown as ganged or mechanically connected. A cam or linkage arrangement may be employed to provide approximately a .5 millisecond delay between the closing of switch S–2 after the closing of switch S–1. After a delay which may be about 5 milliseconds from the closing of switch S–1, or other suitable time periods depending upon the circuit parameters, switch S–2 will be closed, causing the trigger charge from capacitor 23 to be applied through the winding of auto transformer 33 to electrode 25 of electron flash tube 27, causing the tube to fire.

Referring now to FIG. 2 for the operation of the circuit of this invention, it may be seen that the transformer core 15 has a square loop hysteresis curve. The core is initially set at state 1 by any conventional means such as an additional winding on the core, not shown, which is energized to reset the core to state 1. Referring additionally to FIGS. 1 and 3 of the drawing, the capacitors 19 and 23 are first charged by voltage source 21. When it is desired to operate the flash unit, switch S–1 and switch S–2 are closed sequentially in the order named, the time between the closing of switch S–1 and switch S–2, which may be for illustration, about 5 milliseconds. At the instant that switch S–1 is closed, the charge of capacitors 19 will be applied to primary winding 13 of saturable core transformer 11. During a finite time period T which may be, for purposes of illustration, 10 milliseconds, the saturable core is changing from saturation state 1 to saturation state 2. During this time period, a secondary voltage $E_s$, FIG. 3, is induced on the secondary winding 15 of the saturable core transformer.

The time sequence of the operation of the changing circuit is as follows. At a time $t_1$, after the capacitors have been charged, switch S–1 is closed and a current $I_p$ is applied to the primary winding of saturable core transformer 11. At this time, voltage $E_s$ is developed across the secondary winding of the transformer. At time $t_2$ which may be approximately .5 millisecond, switch S–2 is closed and a voltage $E_t$ is produced at electrode 25 of the flash tube 27 and the tube is fired. Dashed line 41 represents the minimum voltage level of $E_s$ that is necessary to fire the tube.

In the foregoing, the invention has been described with reference to a specific illustrative device. It will be evident, however, that variations and modifications as well as the substitution of equivalent elements for those shown herein for illustration may be made without departing from the broader scope and spirit of the invention as set forth in the appended claims. The specification and drawing are accordingly to be regarded in an illustrative rather than in a limiting sense.

What is claimed as new and desired to be secured by Letters Patent of the United States is:

An electronic flash tube power supply circuit comprising,
    a bank of parallel-connected capacitors,
    a trigger capacitor,
    a saturable core first transformer having a primary winding,
    a secondary winding, and a saturable core,
    an electrontic flash tube having an anode, a cathode and an ignition electrode,
    a D.C. voltage source having one terminal thereof at ground potential,
    a first switch means having an open position and a closed position,
    a second switch means having an open position and a closed position; said second switch means mechanically coupled to said first switch means in a manner to close .5 millisecond after said first switch means is closed,
    means serially interconnecting said first switch means and said bank of parallel-connected capacitors to the primary winding of said first transformer,
    means connecting the secondary winding of said first transformer to the anode and the cathode of said electronic flash tube, a second transformer having a single winding with a tap thereon, said tap being connected to apply a ground potential thereto, means serially interconnecting the winding of said second transformer, said trigger capacitor and said second switch means to the ignition electrode of said electronic flash tube, means connecting said bank of parallel connected capacitors to said D.C. voltage source, and diode means connecting said trigger capacitor to said source of D.C. voltage.

References Cited by the Examiner
UNITED STATES PATENTS

| | | | |
|---|---|---|---|
| 2,509,005 | 5/1950 | Lord | 315—241 |
| 3,134,048 | 5/1964 | Wolfframm et al. | 315—239 X |

JOHN W. HUCKERT, *Primary Examiner.*

R. F. POLISSACK, *Assistant Examiner.*